3,598,809
FUSED BI- AND TRICYCLIC, DI-, TRIDIAZA-,
AND THIODIAZA COMPOUNDS
Marcel K. Eberle, Madison, and William J. Houlihan,
Mountain Lakes, N.J., assignors to Sandoz-Wander,
Inc., Hanover, N.J.
No Drawing. Filed Oct. 17, 1969, Ser. No. 867,376
Int. Cl. C07d *53/00, 53/02, 93/40*
U.S. Cl. 260—239.3                10 Claims

ABSTRACT OF THE DISCLOSURE

Fused bi- and tricyclic, di-, tri- and thiodiaza compounds, e.g. 2,3,3a,10-tetrahydro - 3 - phenylbenzo[b]pyrrolo[2,3-e][1,4]diazepin-4(3H)-one prepared by treating a corresponding substituted pyridine or pyrroline with a substituted aniline o-phenylenediamine, ethylenediamine or diaminopropane. The compounds are useful at tranquilizers and hypotensives.

This invention relates to substituted fused bi- and tricyclic, di-, tri- and thiodiaza compounds and to processes for their preparation.

The compounds of this invention may be represented by the following structural formula:

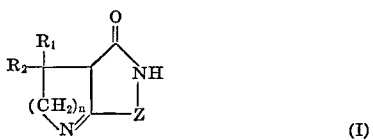

(I)

where $R_1$ and $R_2$ are independently hydrogen or phenyl;
Z is

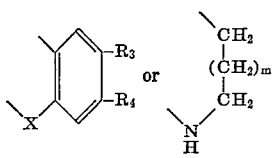

where X is S, or NH and $m$ is 0 or 1;
$R_3$ and $R_4$ are independently, hydrogen, halo having an atomic weight of from 19 to 36, trifluoromethyl, straight chain lower alkyl having 1 to 3 carbon atoms, e.g. methyl, ethyl, or propyl, or straight chain lower alkoxy having 1 to 3 carbon atoms, e.g., methoxy, ethoxy, or propoxy; and
$n$ is 1, 2 or 3;

provided that when one of $R_3$ or $R_4$ is trifluoromethyl, the other is hydrogen.

The compound of Formula I may also be represented by the following structural formulas:

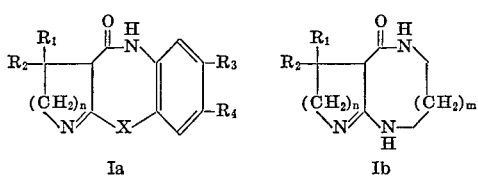

wherein $R_1$, $R_2$, $R_3$, $R_4$, X, $m$ and $n$ have the above stated significance.

The process for preparing the compounds of Formula Ia may be represented by the following reaction scheme A:

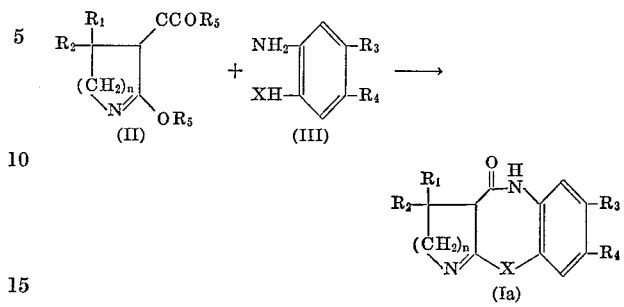

wherein $R_1$, $R_2$, $R_3$, $R_4$, X and $n$ have the above stated significance and $R_5$ is lower alkyl having 1 to 3 carbon atoms, e.g., methyl, ethyl or propyl, isopropyl, with ethyl being preferred.

The compounds of Formula Ia are prepared by treating a compound of Formula II with a compound of Formula III in an inert solvent such as a lower alkanol having 1 to 3 carbon atoms, e.g., methanol, ethanol, or propanol, an alkyl benzene, e.g., toluene, or xylene, or mono or dichloro benzene and the like, in the presence of an inert gas e.g. nitrogen, helium or argon, at a temperature of from 60° C., to the reflux temperature of the solvent, preferably from about 75° to 150° C., for about 2 to 96 hours, preferably 12 to 24 hours. Neither the solvents or temperatures used are critical.

The process for preparing the compounds of Formula Ib may be represented by the following reaction scheme B:

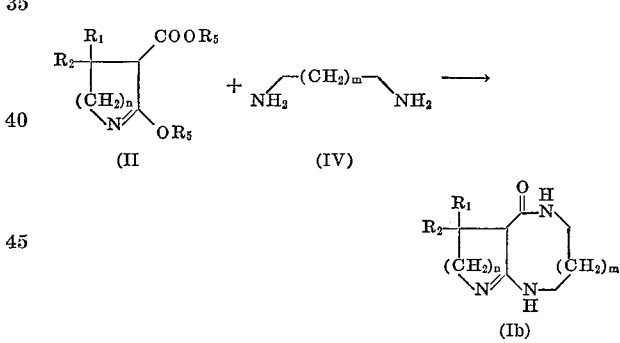

where $R_1$, $R_2$, $R_5$, $m$ and $n$ have the above stated significance.

The compounds of Formula Ib are prepared by treating a compound of Formula II with a compound of Formula IV under the reaction conditions and in the presence of the inert solvents described in scheme A.

The compounds of Formula Ib may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

Standard techniques, e.g., crystallization, may be used to recover compounds Ia and Ib.

Certain of the compounds of Formulas II, III and IV are known and may be prepared by methods disclosed in the literature. Those compounds of Formulas II, III and IV which have not been specifically disclosed may be prepared by analogous methods from known materials.

It will be appreciated by those skilled in the art that when in (III) X is NH, and $R_3$ and $R_4$ are not equal, a mixture of compounds will result. The composition of the mixture will depend on the reaction conditions.

The compounds of Formula I, especially the compounds of Formulas Ia and Ib wherein m is 0, are useful because they possess pharmacological activity in animals. More particularly the compounds are useful as tranquilizers as indicated by their ability to antagonize amphetamine induced stimulation in mice, wherein the mice are each given 2.5 milligrams per kilogram of body weight of amphetamine sulfate and 25 milligrams to 200 milligrams per kilogram of active agent. The locomotor activity of the mice is measured for an 80-minute period at 10-minute intervals with an Actophotometer (manufactured by Woodard Res. Corp., Herndon, Va.).

The compounds of Formula I, especially the compounds of Formulas Ia and Ib where m is 0, are also useful as hypotensives, as indicated by their activity in an anesthetized dog given 20 milligrams per kilogram IV of active agent and tested by blood pressure measurement using a mercury manometer or transducer via a catheter inserted in the carotid or femoral artery.

The compounds of Formula Ib may be administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, maleate, malate, tartrate, methanesulfonate, cyclohexylsulfamate and the like.

The compounds (I) may be administered orally or parenterally and, depending upon the compound employed and the mode of administration, the exact dosage utilized may vary. In general, satisfactory results are obtained when these compounds are administered for the tranquilizer use at a daily dose of about 2 milligrams to about 100 milligrams per kilogram of animal body weight. This daily dosage is preferably administered in divided doses 2 to 4 times a day, or in sustained release form. For most large mammals such as primates, the total daily dosage is from about 150 milligrams to about 1200 milligrams. Dosage forms suitable for internal use comprise from about 37.5 milligrams to about 600 milligrams of the active compound in intimate admixture with a solid or liquid pharmaceutically acceptable carrier or diluent.

For the hypotensive use, satisfactory results are obtained when these compounds are administered at a daily dose of about 3 milligrams to about 150 milligrams per kilogram of animal body weight. This daily dosage is preferably administered in divided doses 2 to 4 times a day, or in sustained release form. For most large mammals such as primates, the total daily dosage is from about 200 milligrams to about 1600 milligrams. Dose forms suitable for internal use comprise from about 50 milligrams to about 800 milligrams of active compound in intimate admixture with a solid or liquid pharmaceutically acceptable carrier or diluent.

A representative formulation suitable for oral administration is a tablet prepared by standard tabletting techniques which contains the following:

| Ingredients: | Parts by weight |
|---|---|
| 2,3,3a,10 - tetrahydro - 3 - phenylbenzo[b]pyrrolo[2,3-e][1,4]diazepin-4(3)-one | 50 |
| Tragacanth | 2 |
| Lactose | 39.5 |
| Corn starch | 5 |
| Talcum | 3 |
| Magnesium stearate | 0.5 |

This invention is illustrated but not limited by the following examples.

EXAMPLE 1

3,4,4a,11-tetrahydro-2H-benzo[b]pyrido[2,3-e][1,4]diazepin-5(6H)-one

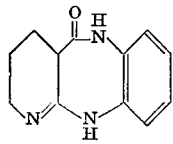

A mixture of 10 g. of 2-ethoxy-3-ethoxycarbonyl-3,4,5,6-tetrahydropyridine and 5 g. of o-phenylenediamine was refluxed under an atmosphere of nitrogen for 72 hours in 75 cc. of xylene. When the solution was cooled, the solid precipitated. The solid was then heated with acetone and filtered, and the product, 3,4,4a,11-tetrahydro-2H-benzo[b]pyrido[2,3-e][1,4]diazepin-5(6H)-one, was recovered; M.P. 255–258° C.

EXAMPLE 2

2,3,4,4a-tetrahydrobenzo[b]pyrido[3,2-f][1,4]thiazepin-5(6H)-one

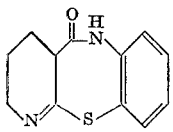

A mixture of 2.0 g. of 1-ethoxy-2-ethoxycarbonyl-3,4,5,6-tetrahydropyridine and 1.25 g. of 2-aminothiophenol in 40 cc. of xylene was refluxed under an atmosphere of nitrogen for 18 hours. Then the solvent was evaporated and the liquid solidified. The product, 2,3,4,4a-tetrahydrobenzo[b]pyrido[3,2-f][1,4]thiazepin - 5(6H) - one, was recrystallized from methanol by addition of ether; M.P. 125–127° C.

EXAMPLE 3

2,3,3a,10-tetrahydro-3-phenylbenzo[b]pyrrolo[2,3-e][1,4]diazepin-4(3H)-one

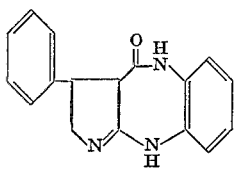

A mixture of 5.2 g. of 2-ethoxy-3-ethoxycarbonyl-4-phenyl-2-pyrroline-1, 2.2 g. of o-phenylenediamine in 50 cc. of absolute ethanol was refluxed under an atmosphere of nitrogen for 24 hours. The solvent was evaporated under reduced pressure. The product, 2,3,3a,10-tetrahydro-3 - phenylbenzo[b]pyrrolo[2,3-e][1,4]diazepin - 4(3H)-one was recrystallized from acetone by the addition of hexane, M.P. 229–231° C.

EXAMPLE 4

3,3a-dihydro-3-phenyl-2H-benzo[b]pyrrolo[3,2-f][1,4]thiazepin-4(5H)-one

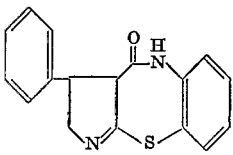

A mixture of 2-ethoxy-3-ethoxycarbonyl-4-phenyl-pyrroline (65 g.) was refluxed under an atmosphere of nitrogen for 18 hours with 28 g. of 2-aminothiophenol in 250 cc. of absolute ethanol. When the solvent was cooled in an ice bath a solid precipitated. Recrystallization from methanol yielded the product, 3,3a-dihydro-3-phenyl-2H-benzo[b]pyrrolo[3,2-f][1,4]thiazepin - 4(5H) - one; M.P. 150–153° C.

EXAMPLE 5

Using the conditions of Example 1, but in place of o-phenylenediamine, starting with, (a) 4-chloro-o-phenylenediamine,
(b) 4,5-dimethyl-o-phenylenediamine,
(c) 4,5-dimethoxy-o-phenylenediamine,
(d) 4-trifluoromethyl-o-phenylenediamine, the following products are obtained:

(a) 8-chloro-3,4,4a,11-tetrahydro-2H-benzo[b]pyrido[2,3-e][1,4]diazepin-5(6H)-one,
(b) 3,4,4a,11-tetrahydro-8,9-dimethyl-2H-benzo[b]pyrido[2,3-e][1,4]diazepin-5(6H)-one,
(c) 3,4,4a,11-tetrahydro-8,9-dimethoxy-2H-benzo[b]pyrido[2,3-e][1,4]diazepin-5(6H)-one,
(d) 8-trifluoromethyl-1,3,4,4a,11-tetrahydro-2H-benzo[b]pyrido[2,3-e][1,4]diazepin-5(6H)-one, respectively.

EXAMPLE 6

Using the conditions of Example 1, but in place of 2-ethoxy-3-ethoxycarbonyl - 3,4,5,6 - tetrahydropyridine, starting with 2 - ethoxy - 3 - ethoxycarbonyl - 4,5,6,7-tetrahydro - 3H - azepine, the product 2,3,4,5,5a,11-hexahydrobenzo[b]azepino[2,3-e][1,4]diazepin - 6(7H) - one is obtained.

EXAMPLE 7

1,2,3,4,5a,6,7,8-octahydropyrido[2,3-e][1,4]diazepin-5(5H)-one

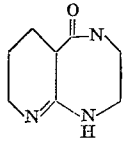

A mixture of 4.0 g. of 2-ethoxy-3-ethoxycarbonyl-3,4,5,6-tetrahydropyridine and 1.3 g. of ethylenediamine was refluxed under an atmosphere of nitrogen for 18 hours in 30 cc. of absolute ethanol. Upon evaporation of the solvent a white solid precipitated. Acetone was added and the solid was filtered off. The solid was heated with 25 cc. of hot acetone and filtered. The product, 1,2,3,4,5a,6,7,8 - octahydropyrido[2,3-e][1,4-]diazepin-5(5H)-one, was recovered; M.P. 174–178° C.

EXAMPLE 8

1,2,3,4,6,7-hexahydro-6-phenylpyrrolo[2,3-e][1,4]diazepin-5(5aH)-one

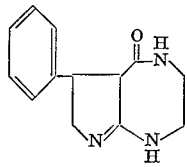

A mixture of 15.6 g. of 2-ethoxy-3-ethoxycarbonyl-4-phenylpyrroline and 3.8 g. of ethylenediamine was refluxed under an atmosphere of nitrogen in 100 cc. of absolute ethanol for 18 hours. Then the solvent was evaporated under reduced pressure and dissolved in acetone. From this solution the product, 1,2,3,4,6,7-hexahydro-6-phenylpyrrolo[2,3-e][1,4]diazepin-5(5aH)one, precipitated; M.P. 175–176° C.

EXAMPLE 9

1,2,3,4,6a,7,8,9-octahydropyrido[2,3-b][1,5]diazocin-6(5H)-one

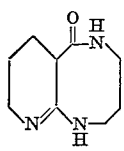

A mixture of 3.0 g. of 2-ethoxy-3-ethoxycarbonyl-3,4,5,6-tetrahydropyridine, 1.5 g. of 1,3 diaminopropane was refluxed in 40 cc. of toluene under an atmosphere of nitrogen for 20 hours. The solvent was evaporated under reduced pressure and the liquid solidified overnight. Recrystallization from acetone/hexane (1:1) yielded the product, 1,2,3,4,6a,7,8,9-octahydropyrido[2,3-b][1,5]-diazocin-6(5H)-one; M.P. 161–164° C.

EXAMPLE 10

2,3,4,5,7,8-hexahydro-7-phenyl-1H-pyrrolo-[2,3-b][1,5]diazocin-6(6aH)-one

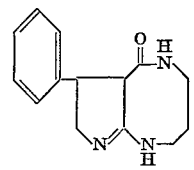

A mixture of 10.2 g. of 2-ethoxy-3-ethoxycarbonyl-3-phenyl-1-pyrroline and 3.3 g. of 1,3-diaminopropane in 30 cc. of absolute ethanol was refluxed under an atmosphere of nitrogen for 48 hours. The solvent was evaporated under reduced pressure and the remaining oil was dissolved in methylene chloride and precipitated with hexane. Recrystallization from acetone by the addition of hexane yielded the product, 2,3,4,5,7,8-hexahydro-7-phenyl-1H-pyrrolo[2,3-b][1,5]diazocin-6 - (6aH)-one; M.P. 189–192° C.

What is claimed is:
1. A compound of the formula

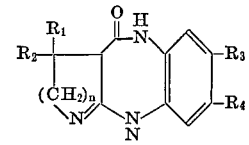

wherein $R_1$ and $R_2$ are independently hydrogen or phenyl;
$R_3$ and $R_4$ are independently, hydrogen, halo having an atomic weight of from 19 to 36, trifluoromethyl, straight chain lower alkyl having 1 to 3 carbon atoms, or straight chain lower alkoxy having 1 to 3 carbon atoms, and
$n$ is 1, 2, or 3 or a pharmaceutically acceptable acid addition salt thereof; provided that where one of $R_3$ or $R_4$ is trifluoromethyl, the other is hydrogen.

2. The compound of claim 1 which is 3,4,4a,11-tetrahydro-2H-benzo[b]pyrido[2,3-e][1,4]diazepin - 5(6H)-one.

3. The compound of claim 1 which is 2,3,3a,10-tetrahydro - 3 - phenylbenzo[b]pyrrolo[2,3-e][1,4]diazepin-4-(3H)-one.

4. The compound of claim 1 which is 8-chloro-3,4,4a,11-tetrahydro - 2H-benzo[b]pyrido[2,3-e][1,4]diazepin-5(6H)-one.

5. The compound of claim 1 which is 3,4,4a,11-tetrahydro-8,9,dimethyl - 2H - benzo[b]pyrido[2,3-e][1,4]diazepin-5(6H)-one.

6. The compound of claim 1 which is 3,4,4a,11-tetrahydro-8,9-dimethoxy - 2H - benzo[b]pyrido[2,3-e][1,4]diazepin-5(6H)-one.

7. The compound of claim 1 which is 8-trifluoromethyl-3,4,4a,11-tetrahydro - 2H - benzo[b]pyrido[2,3-e][1,4]diazepin-5(6H)-one.

8. The compound of claim 1 which is 2,3,4,5,5a,11-hexahydrobenzo[b]azepino[2,3-e][1,4]diazepin - 6(7H)-one.

9. The process for preparing a compound of claim 1 in free base form which comprises treating in an inert solvent and in the presence of an inert gas a compound of the formula

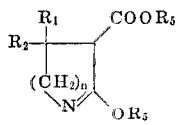

with a compound of the formula

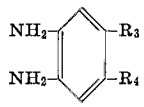

where
$R_1$ and $R_2$ are independently hydrogen, or phenyl,
$R_3$ and $R_4$ are independently hydrogen, halo having an atomic weight of from 19 to 36, trifluoromethyl, straight chain lower alkyl having 1 to 3 carbon atoms, or straight chain lower alkoxy having 1 to 3 carbon atoms,
$R_5$ is lower alkyl having 1 to 3 carbon atoms and
$n$ is 1, 2 or 3,
provided that when one of $R_3$ or $R_4$ is trifluoromethyl, the other is hydrogen.

10. A compound of the formula

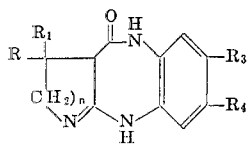

wherein
$R_1$ and $R_2$ are each, independently, hydrogen or phenyl;
$R_3$ and $R_4$ are each, independently, hydrogen, halo having an atomic weight of from 19 to 36, trifluoromethyl, straight chain lower alkyl having 1 to 3 carbon atoms, or straight chain lower alkoxy having 1 to 3 carbon atoms, and
provided that when one of $R_3$ or $R_4$ is trifluoromethyl, the other is hydrogen.

References Cited
UNITED STATES PATENTS 3,316,251   4/1967   Schmidt _____ 260—239.3

HENRY R. JILES, Primary Examiner

R. T. BOND, Assistant Examiner

U.S. Cl. X.R.

260—239.3B, 239BE, 294.8B, 321R, 326.5SA, 326.5B, 326.5R, 295.5R, 326.12; 424—244, 267, 274, 275